United States Patent
Watanabe et al.

(10) Patent No.: US 8,825,240 B2
(45) Date of Patent: Sep. 2, 2014

(54) CONTROL DEVICE FOR ELECTRIC ROLLING STOCK

(71) Applicant: Hitachi, Ltd., Tokyo (JP)

(72) Inventors: Atsushi Watanabe, Mito (JP); Motomi Shimada, Mito (JP); Toshihiro Aono, Abiko (JP); Shuichi Tachihara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/775,297

(22) Filed: Feb. 25, 2013

(65) Prior Publication Data

US 2013/0238176 A1    Sep. 12, 2013

(30) Foreign Application Priority Data

Mar. 8, 2012   (JP) ................. 2012-051134

(51) Int. Cl.
  *G05D 1/00*    (2006.01)
(52) U.S. Cl.
  USPC ............................ 701/20; 180/197
(58) Field of Classification Search
  CPC .................. B61C 15/12; B60L 3/10
  USPC ........ 701/20, 22, 70, 74, 82, 90, 19; 180/197; 303/139, 113.2
  See application file for complete search history.

(56) References Cited

U.S. PATENT DOCUMENTS

2010/0179713 A1*   7/2010   Yabuuchi et al. ............... 701/19

FOREIGN PATENT DOCUMENTS

| JP | 1-243803 | 9/1989 |
| JP | 2000-125406 | 4/2000 |

* cited by examiner

*Primary Examiner* — Thomas Black
*Assistant Examiner* — Luke Huynh
(74) *Attorney, Agent, or Firm* — Antonelli, Terry, Stout & Kraus, LLP.

(57) ABSTRACT

In order to minimize a calculation load and surely obtain a maximum adhesion torque, estimated adhesion torques are always stored, an maximum value is obtained from the stored plural estimated adhesion torques immediately before slip/skid is detected when detecting the slip/skid, and the maximum value is set as a maximum adhesion torque. The maximum adhesion torque immediately before the slip/skid is detected is compared with a value of the estimated adhesion torque when the slip/skid is detected. When the calculated value exceeds a threshold value, it is determined as a condition where an adhesion coefficient drastically drops, and a suppression/return ratio of the torque is switched to a lower value than that under a condition where the adhesion coefficient does not drastically drop. The value of the torque at the time of suppression or return is set to a smaller value to surely suppress the slip/skid.

17 Claims, 8 Drawing Sheets

τ_α1 : RETURN TORQUE IN NORMAL STATE
τ_α2 : SUPPRESSION TORQUE IN NORMAL STATE
τ_β1 : RETURN TORQUE IN RAPID DROP STATE
τ_β2 : SUPPRESSION TORQUE IN RAPID DROP STATE

FIG. 10

# CONTROL DEVICE FOR ELECTRIC ROLLING STOCK

FIELD OF THE INVENTION

The present invention relates to a technique for controlling slip/skip occurring between wheels of an electric rolling stock and rails.

BACKGROUND OF THE INVENTION

A control under which a driving or braking torque is suppressed and converged if wheels of a train Slip/skid, and the torque is returned to an original one if the slip/skid is converged is called "readhesion control". There is the readhesion control using an adhesion torque which is a maximum value of the tangential force coefficient, and corresponds to an adhesion coefficient determined according to environmental conditions between the wheels and rails. The related art is disclosed in Japanese Unexamined Patent Application Publication No. Hei-1(1989)-243803. Regarding a value returning the torque, in the disclosure of this publication, "the adhesion coefficient is always calculated, and at the same time, a motor current corresponding to a torque generated in an electric motor, which is calculated by the generated torque calculation unit, is calculated in advance. When slip/skid is detected by the slip/skid detection unit, the motor current corresponding to the maximum or substantially maximum adhesion coefficient is calculated according to the adhesion coefficients before and immediately after slip/skid occurs, and the motor current corresponding to the torque generated in the electric motor. The motor current is supplied as a current command of the electric motor." The related art is also disclosed in Japanese Unexamined Patent Application Publication No. 2000-125406. In the disclosure of this publication, "when the adhesion coefficient drastically fluctuates, a speed detection delay of a main electric motor develops into large slip and skid. In order to produce readhesion, the torque must be largely reduced, thereby leading to the deterioration of a ride quality, and a reduction in the utilization ratio of the adhesion force. A torque command value of the main electric motor is controlled while the tangential force and the tangential force coefficient are momentarily estimated by a minimal-order disturbance observer according to an estimated speed small in delay using voltage and current information of the main electric motor with high precision and promptly (refer to abstract of the publication).

SUMMARY OF THE INVENTION

When a train car runs on ice, or gets outside with snow from a dried tunnel, an adhesion state between the train car and the rails drastically changes, and the adhesion coefficient is instantaneously lessened, resulting in occurrence of slip/skid. Japanese Unexamined Patent Application Publication No. Hei-1(1989)-243803 discloses that the electric rolling stock is driven under the control in a state where the adhesion coefficient between the rails and the wheels is maximum or nearly maximum. When the slip/skid is caused by rapid drop of the adhesion coefficient, a control corresponding to the low adhesion coefficient after rapid drop is desirable. However, Japanese Unexamined Patent Application Publication No. Hei-1(1989)-243803 cannot deal with a case in which the adhesion state drastically changes, and the adhesion coefficient is instantaneously lessened as described above, thereby leading to a possibility that the slip/skid is again induced. Also, Japanese Unexamined Patent Application Publication No. 2000-125406 discloses that the tangential force coefficient is estimated by the minimal-order disturbance observer with the use of an estimated value of a rotating speed obtained according to the voltage and current of the main electric motor. The tangential force coefficient is estimated by calculation, and a calculation load for each control cycle becomes very large.

Under the circumstances, the present invention aims at conducting a readhesion control at a high processing speed and with high precision while suppressing the calculation load even if the adhesion coefficient is instantaneously changed. For example, when the adhesion state is drastically reduced to produce the slip/skid, a range of reduction of the torque is made larger than that when the adhesion state is not drastically changed to prevent the slip/skid from occurring again.

In order to solve the above problem, for example, a configuration defined by claims is applied.

The present application includes a plurality of solutions to the problem, and according to one example of those solutions, there is provided a control device for an electric rolling stock which conducts an adhesion control of an electric rolling stock on the basis of an adhesion torque, including: a slip/skid detection control unit that detects slip/skid of the electric rolling stock; an adhesion torque calculation unit that calculates an adhesion torque of the electric rolling stock; an adhesion torque retention unit that stores the calculated adhesion torque at regular intervals, outputs a first adhesion torque on the basis of a plurality of the adhesion torques before detection when the slip/skid is detected, and outputs the adhesion torque in detection of the slip/skid as a second adhesion torque; a command torque generation unit that reduces a drive torque of an electric motor to a first drive torque when the slip/skid is detected; and a detection unit that detects a rapid change of the adhesion state on the basis of the first adhesion torque and the second adhesion torque, in which the command torque generation unit increases a range of reduction of a first torque value relative to a drive torque immediately before the slip/skid is detected when the rapid change of the adhesion state is detected, more than that when the rapid change is not detected.

According to the present invention, even if the adhesion coefficient is drastically lessened, the slip/skid can be suppressed at a low calculation load with high precision, to thereby improve an acceleration and deceleration performance of the electric rolling stock.

Problems, configurations, and advantages other than those described above will become apparent from the description of the following embodiments.

DETAILED DESCRIPTION OF THE PREFERRED EMBODIMENTS

Figure 1:
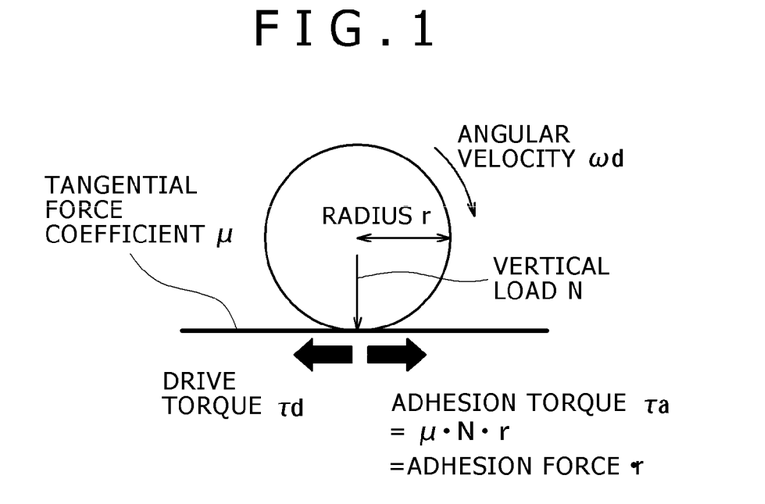
FIG. 1 is a diagram illustrating forces exerted on wheels according to the present invention.

A rail vehicle can be accelerated or decelerated by an adhesion force exerted between its wheels and rails, and the adhesion force is determined according to a vertical load N exerted between the wheels and the rails, and a tangential force coefficient μ indicative of a friction coefficient between the wheels and the rails (refer to FIG. 1). The vertical load is determined according to a car weight including a truck. The tangential force coefficient is determined according to an adhesion coefficient μmax (=a maximum value of the tangential force coefficient) determined by environmental conditions (oily water, surface roughness, dust, etc.) between the wheels and the rails, and the slip speed of the wheels, as illustrated in a tangential force coefficient map of FIG. 2

Figure 2:
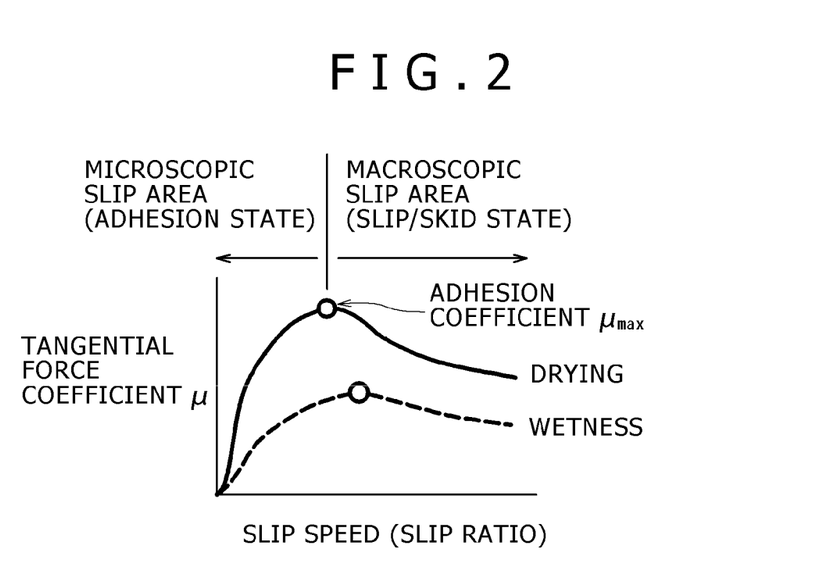
FIG. 2 is a diagram illustrating a relationship between a slip speed and a tangential force coefficient according to the present invention.

The slip/skid of the wheels occurs when a drive/braking torque τd exerted on the wheels exceeds a potential maximum adhesion torque τa_max, as illustrated in FIG. 1. In the present specification, the slip/skid represents a phenomenon in which the slip speed of the wheels as illustrated in FIG. 2 arrives at a range corresponding to a macroscopic slip area on the tangential force coefficient map. When the slip/skid occurs, an acceleration performance of the vehicle is detracted. For that reason, a torque control such as a readhesion control is implemented, which reduces the drive/braking torque and converges the slip/skid when the slip/skid is detected, and returns the torque to an original torque after the slip/skid has been converged. In particular, when the slip/skid occurs because the tangential force coefficient μ changes from DRY (drying) to WET (wetness), the adhesion coefficient of the WET state is smaller than that of the DRY state, resulting in a risk that the slip/skid may again occur in the torque control based on the DRY state.

Figure 3:
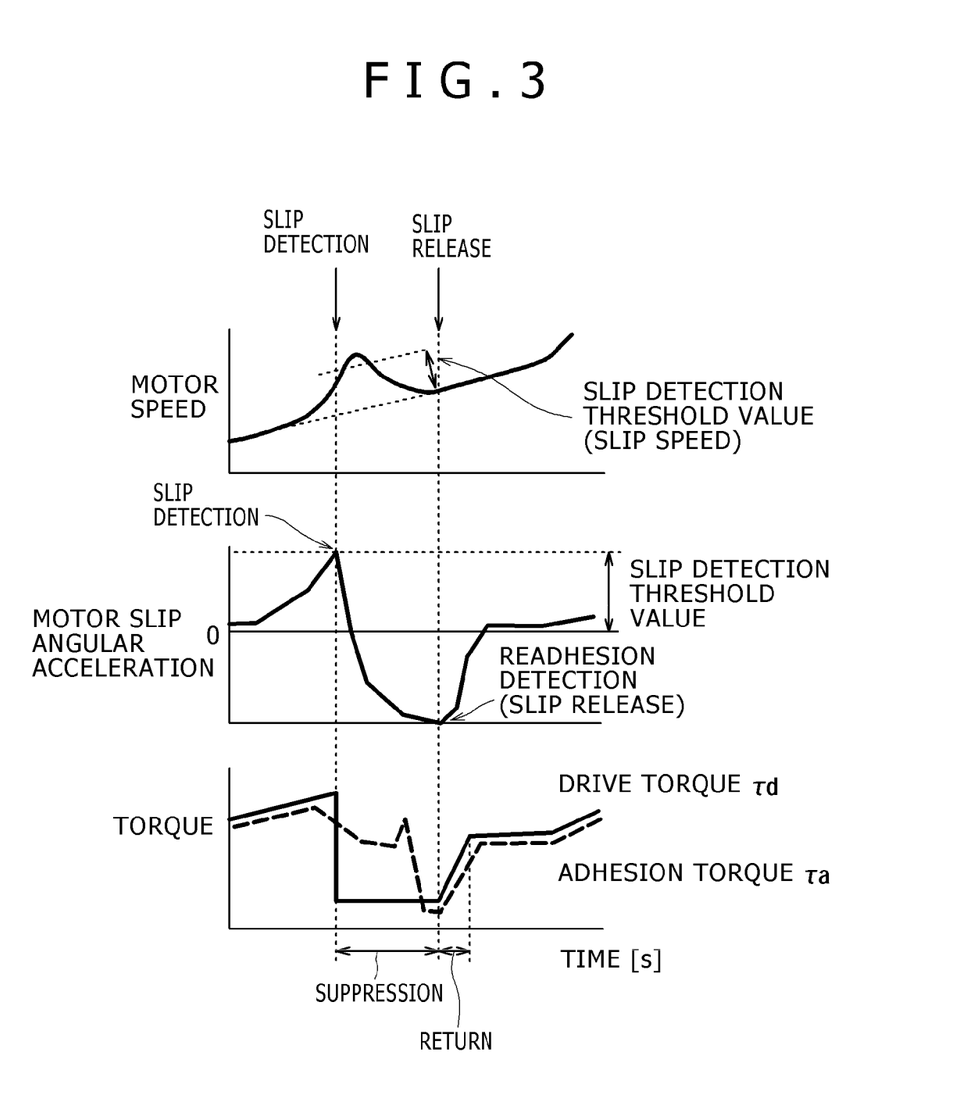
FIG. 3 is a diagram illustrating an outline of a readhesion control according to the present invention.

In the readhesion control, when the slip/skid occurs, the drive/braking torque is suppressed to be smaller than the maximum adhesion torque that can occur between the wheels and the rails to suppress the slip/skid. As a result, if the torque is reduced more than necessary, the acceleration and deceleration performance is lessened. Also, when a value of a return torque after the torque suppression is extremely smaller than the maximum adhesion torque, acceleration and deceleration become insufficient. On the contrary, when the value of the return torque is extremely larger than the adhesion torque, the slip/skid again occurs. For that reason, how to determine the value of an appropriate return torque is important. FIG. 3 illustrates a sequence of readhesion control in which the torque is suppressed and decreased upon detection of the slip, and the torque is returned to an original torque after detection of the readhesion to again increase the torque. In the present invention, the suppression torque represents a value to which the torque is reduced in order to subject the slipped or skidded wheels to readhesion. Hence, when the torque is gradually or continuously changed in order to provide readhesion, a main value in the above readhesion zone is set as a suppression torque. Likewise, the return torque is set as a value which is increased in order to conduct the acceleration and deceleration control of the train after readhesion.

Hereinafter, a description will be given of embodiments of the present invention with reference to the accompanying drawings.

First Embodiment

Figure 10:
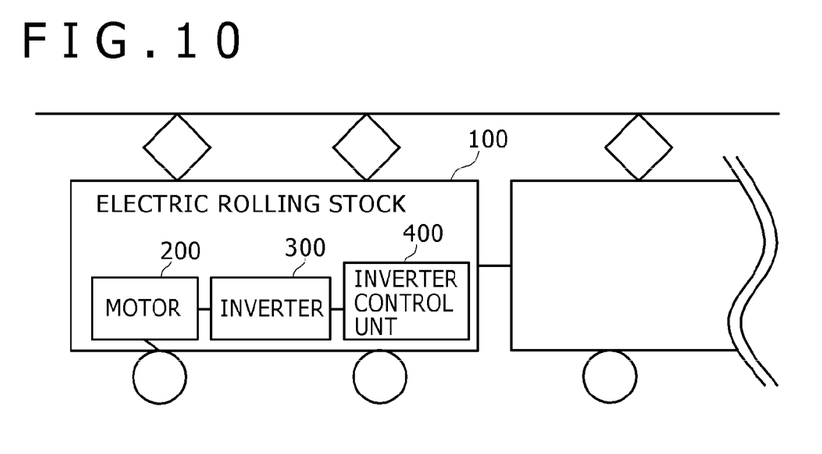
FIG. 10 is a diagram illustrating an example in which the present invention is applied to an electric rolling stock.

In this example, in an electric rolling stock control device mounted on an electric rolling stock 100 as illustrated in FIG. 10, a readhesion control of slip/skid is conducted so that whether the adhesion coefficient drastically drops, or not, is determined, and different controls are conducted according to the respective determination results. The electric rolling stock 100 includes wheels driven by an electric motor 200, an inverter 300 that controls the electric motor 200, and an inverter control unit 400 that controls the inverter 300. It is assumed that this embodiment is a part or one function of the inverter control unit 400. The electric rolling stock may be driven by an electric motor, and an electric power may be supplied from a cable, a storage battery, or the other driving sources.

Figure 4:
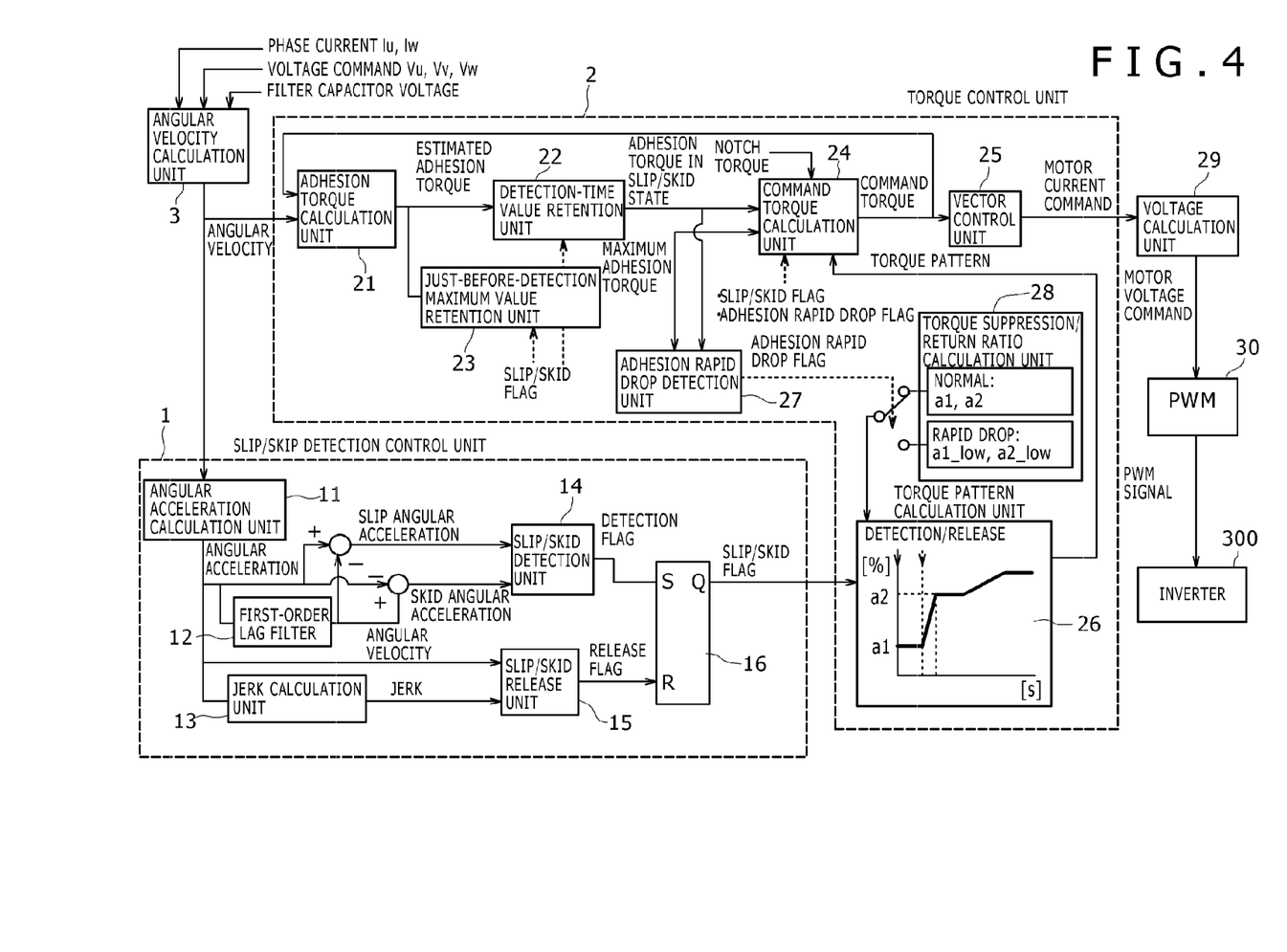
FIG. 4 is a block diagram illustrating the readhesion control according to the present invention.

FIG. 4 is a block diagram of a readhesion control according to this embodiment, which illustrates a part of a configuration of the inverter control unit 400. The readhesion control unit includes an angular velocity calculation unit 3 that calculates an angular velocity of the motor, a slip/skid detection control unit 1 that detects the slip/skid of the wheels on the basis of motor angular velocity information, and a torque control unit 2 that calculates a torque command to the motor on the basis of slip/skid detection information.

The slip/skid detection control unit 1 determines the detection and release of the slip/skid of the wheels with the use of a motor angular velocity obtained by the angular velocity calculation unit 3, and outputs a slip/skid flag.

When the slip is detected, a slip/skid detection unit 14 detects slip, and outputs a flag when a slip angular acceleration obtained by subtracting a motor angular acceleration corresponding to the vehicle acceleration obtained by application of a first-order lag filter 12 from the motor angular acceleration obtained by an angular acceleration calculation unit 11 is larger than a given threshold value. Also, when the skid is detected, the slip/skid detection unit 14 detects skid, and outputs a flag when a skid angular acceleration obtained by subtracting the motor angular acceleration obtained by the angular acceleration calculation unit 11 from the motor angular acceleration corresponding to the vehicle acceleration obtained by application of the first-order lag filter 12 is larger than a given threshold value.

A slip/skid release unit 15 detects the release of the slip/skid with the use of the motor angular acceleration obtained by the angular acceleration calculation unit 11, and a jerk (a first-order differential value of the angular acceleration) obtained by a jerk calculation unit 13, and outputs a flag. In the detection of the slip release after the slip has been detected, the slip/skid release unit 15 outputs a slip release detection flag when conditions that the angular acceleration is smaller than a given threshold value, and the jerk is larger than a given threshold value are met. Also, in the detection of the skid release after the skid has been detected, the slip/skid release unit 15 outputs a skid release detection flag when conditions that the angular acceleration is larger than the given threshold value, and the jerk is smaller than the given threshold value are met.

A flip-flop 16 outputs a slip/skid detection flag on the basis of the detection flag of the slip/skid output by the slip/skid detection unit 14, and the release flag of the slip/skid output by the slip/skid release unit.

The torque control unit 2 calculates and outputs a motor current command required to realize the command torque at the time of the readhesion control. An adhesion torque calculation unit 21 calculates an estimated adhesion torque with the use of the angular velocity of the motor obtained by the angular velocity calculation unit 3, and motor command torque information. An estimated adhesion torque $\tau_a$ of a wheel shaft conversion is obtained by converting Expression (1) which is a motion equation related to the rotation of the wheels into $\tau_a$ indicated in Expression (1)'. Also, just for reference, the adhesion torque is represented by the vertical load N exerted between the wheels and the rails, and the tangential force coefficient μ presenting the friction coefficient between the wheels and the rails, as represented by Expression (2). In general, the rail vehicle is equipped with a speed reducer between a motor output shaft and a wheel shaft. When the adhesion torque is calculated by the motor shaft conversion in the torque control unit 2, the adhesion torque is obtained by dividing the torque of the vehicle shaft conversion represented by Expressions (1) and (2) by a speed reduction ratio.

$$J\frac{d\omega_d}{dt} = \tau_d - \tau_a \quad \text{Expression (1)}$$

$$\tau_a = \tau_d - J\frac{d\omega_d}{dt} \quad \text{Expression (1)'}$$

where $\tau_d$ is the drive torque [N·m], $\tau_a$ is the adhesion torque [N·m], J is an inertia of the wheels (wheel basis) [Kg·m$^2$], and $\omega_d$ is a rotating angular acceleration of the wheels [rad/s].

$$\tau_a = F_a \cdot r \quad \text{Expression (2)}$$
$$= \mu \cdot N \cdot r$$

where $F_a$ is the adhesion force [N], r is a radius of the wheels [m], μ is the tangential force coefficient [–], and N is the vertical load [N].

A detection-time value retention unit 22 retains an estimated adhesion torque when the slip/skid detection control unit 1 detects the slip/skid, and the slip/skid flag turns on, and outputs the estimated adhesion torque as an adhesion torque τe_slip at the time of slip/skid. A just-before-detection maximum value retention unit 23 retains the estimated adhesion torque obtained by an adhesion torque calculation unit 20 till a given time before a time of the slip/skid detection. The just-before-detection maximum value retention unit 23 then selects a maximum value from the values of the retained plural estimated adhesion torques when the slip/skid detection control unit 1 detects the slip/skid, and the slip/skid flag turns on, and outputs the maximum value as a maximum adhesion torque τe_max (Since the rail vehicle is decelerated in the skid state, a sign of the torque is negative. However, when the adhesion torque is considered as an absolute value, the adhesion torque is obtained in the same manner as that in the slip state. Therefore, the slip state and the skid state are dealt with in the same manner hereinafter unless otherwise noted.). The just-before-detection maximum value retention unit 23 may retain the estimated adhesion torque continuously, for a given period, at varied time intervals according to the record load. Thus, the maximum adhesion torque can be estimated at the low calculation costs because the maximum adhesion torque is not calculated by directly solving the equation, and intervals at which the adhesion torque is recorded are not unnecessarily thickened. With the suppression of the calculation costs, a time required for processing can be also reduced, and the real time property of the processing is also improved. In particular, when the response is emphasized, the recording intervals of the adhesion torque may be more narrowed.

Figure 5:
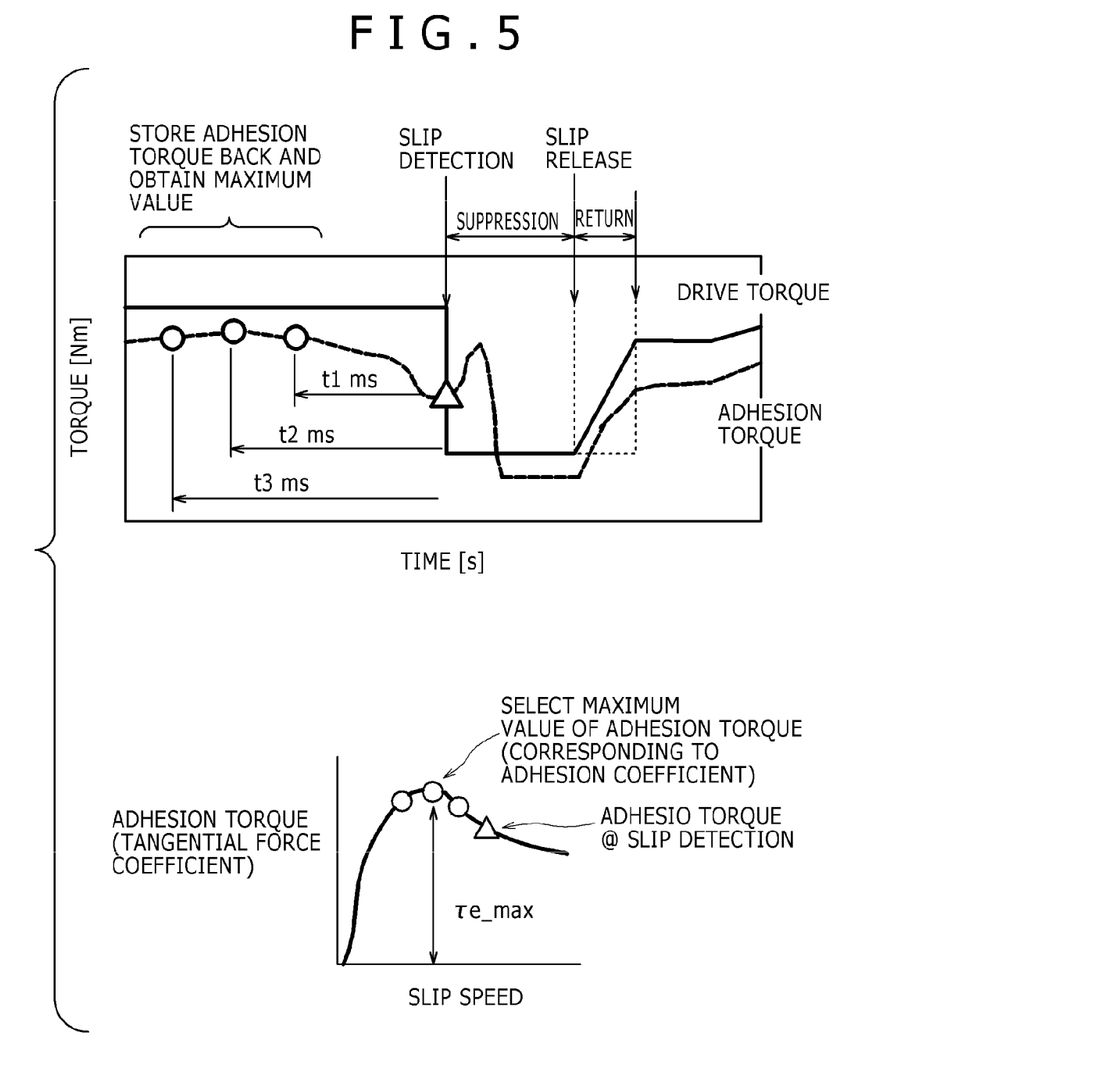
FIG. 5 is a diagram illustrating a process of obtaining a maximum adhesion torque according to the present invention.

The maximum adhesion torque τe_max thus obtained becomes the adhesion torque corresponding to the adhesion coefficient which is the maximum value of the tangential force coefficient illustrated in FIG. 5. This is because, in a process of gradually increasing the slip speed to result in the slip detection, the slip speed always passes through an (adhesion coefficient) area where the tangential force coefficient becomes peak when arriving at the macroscopic slip area from the microscopic slip area. That is, since the slip speed passes through the maximum adhesion torque area which is a torque corresponding to the adhesion coefficient on the tangential force coefficient map immediately before the slip is detected, the maximum value is selected from the plurality of retained adhesion torques immediately before the slip is detected, to obtain the maximum adhesion torque τe_max with high precision.

Figure 7:
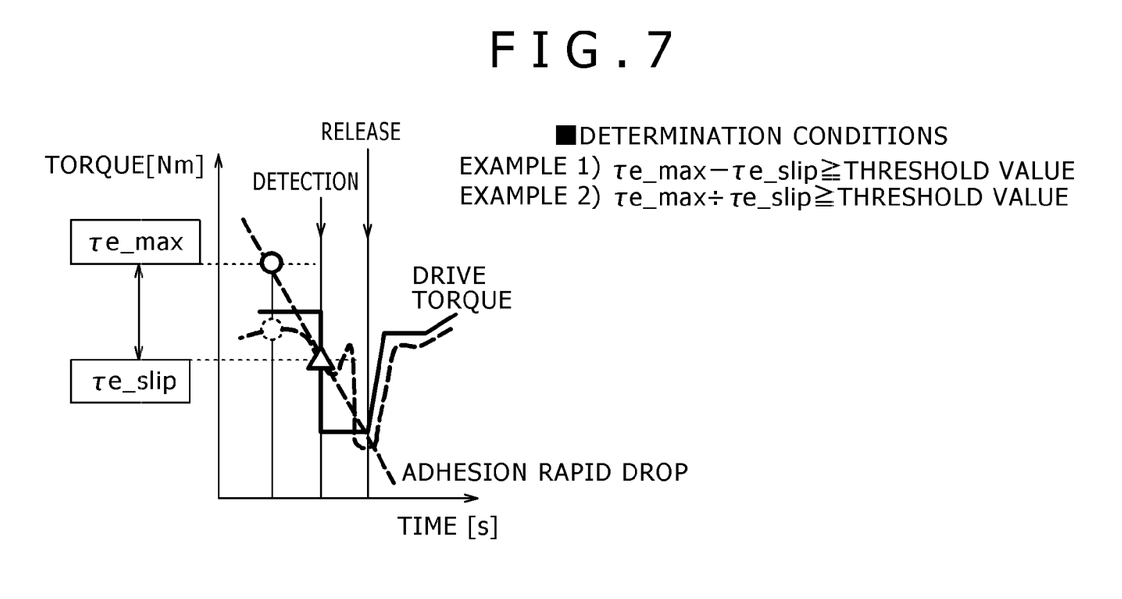
FIG. 7 is a diagram illustrating a process of determining a rapid drop of adhesion conditions according to the present invention.

An adhesion rapid drop detection unit 27 compares the adhesion torque τe_slip in the slip/skid state, which is obtained by the detection-time value retention unit 22, with the maximum adhesion torque τe_max which is obtained by the just-before-detection maximum value retention unit 23 as illustrated in FIG. 7, detects the rapid drop of the adhesion coefficient due to the rapid change of the adhesion state, and outputs an adhesion rapid drop detection flag. The rapid drop detection of the adhesion coefficient is detected by calculating the maximum adhesion torque τe_max and the adhesion torque τe_slip, and detected with the use of, for example, a value of (τe_max−τe_slip) which is a difference between the maximum adhesion torque τe_max and the adhesion torque τe_slip, being larger than a given value, or a value of (τe_max/τe_slip) which is a ratio of the maximum adhesion torque τe_max and the adhesion torque τe_slip, being smaller than a given value. For example, the threshold value for (τe_slip/τe_max) may be set on the basis of "a decreasing rate of the tangential force coefficient", and "a torque suppression rate" which is a suppression rate of the suppression torque which will be described later.

Figure 6:
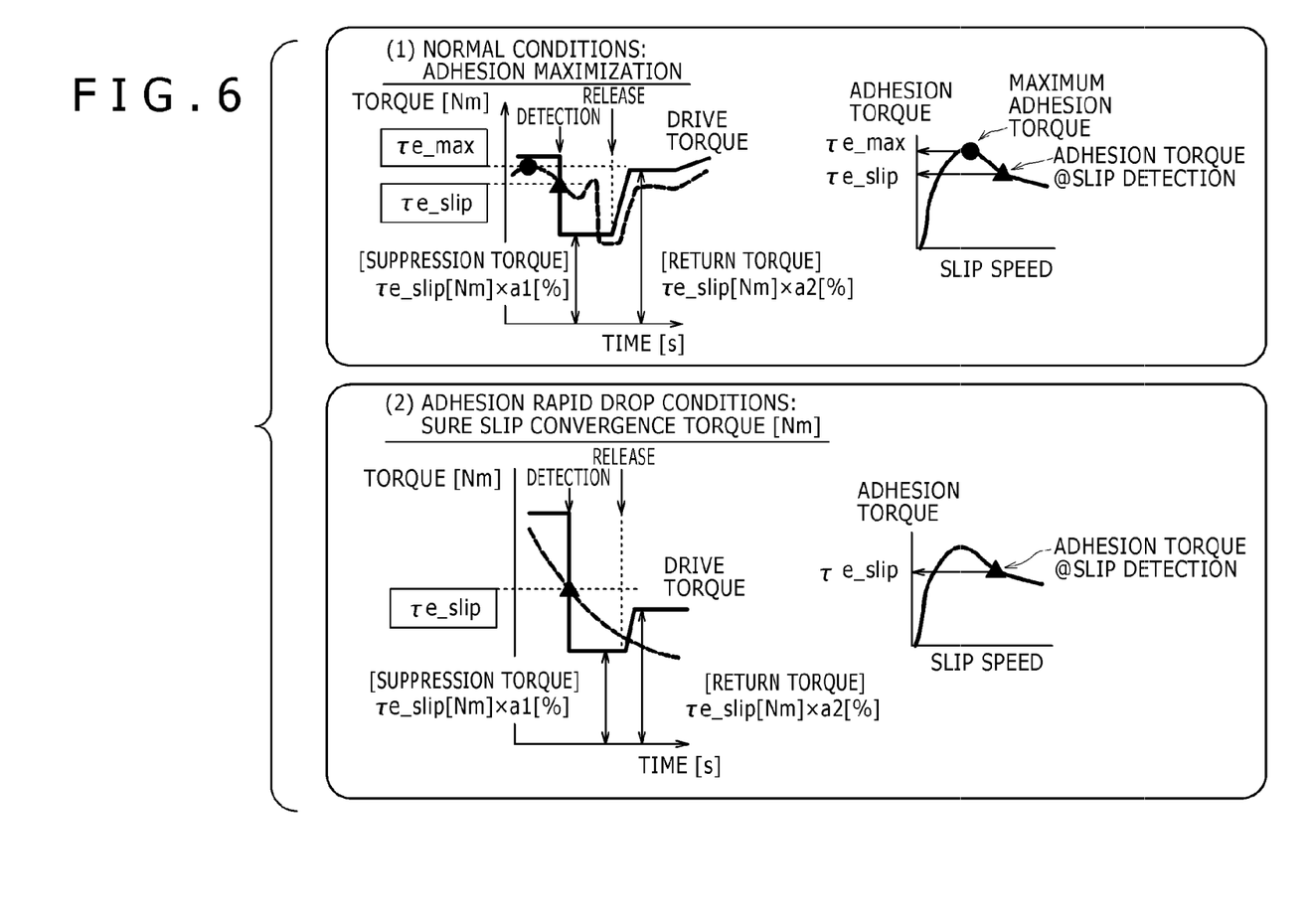
FIG. 6 is a diagram illustrating a readhesion control waveform according to the present invention.

As illustrated in FIG. 6, a torque suppression return ratio calculation unit 28 outputs a suppression/return ratio of a suppression/return torque under a readhesion control. The torque suppression/return ratio calculation unit 28 outputs the torque suppression/return ratio a1, a2[%] in a normal condition where the adhesion rapid drop detection flag is not output. The torque suppression/return ratio calculation unit 28 outputs a1_low and a2_low[%] smaller than a1 and a2[%], which are the suppression/return ratio in the normal condition, in the adhesion rapid drop condition where the adhesion rapid drop detection flag is output. The ratio a1 and a1_low may be set as coefficients for subjecting the slipped or skidded wheels to readhesion.

A torque pattern calculation unit 26 outputs a torque pattern which is a torque suppression/return waveform under the readhesion control on the basis of the slip/skid flag output from the slip/skid detection control unit 1. As the torque suppression/return ratio, the torque pattern calculation unit 26 outputs the torque suppression/return ratio a1 and a2[%]

under the normal condition, and switches the torque suppression/return ratio to a1_low and a2_low[%] smaller than a1 and a2[%] which are the suppression/return ratio under the normal condition, in the adhesion rapid drop condition where the adhesion rapid drop detection flag is output.

A command torque calculation unit 24 outputs a command torque under the readhesion control as illustrated in FIG. 6, on the basis of the adhesion torque τe_slip, the maximum adhesion torque τe_max, and the torque pattern output from the torque pattern calculation unit 26. In the normal condition, it is assumed that the suppression torque is τe_slip[Nm]×a1[%] obtained by multiplying the adhesion torque τe_slip by the suppression ratio a1, and the return torque is τe_max[Nm]×a2[%] obtained by multiplying the maximum adhesion torque τe_max by the suppression ratio a2. In the suppression torque, the torque is suppressed on the basis of the adhesion torque τe_slip at the time of the slip detection to surely converge the slip (τe_max≥τe_slip). In the return torque, the torque is returned to the original torque on the basis of the maximum adhesion torque τe_max to optimize the use of the adhesion torque, thereby maximizing the acceleration and deceleration performance. Also, in the adhesion rapid drop condition, it is assumed that the suppression torque is τe_slip[Nm]×a1_low [%] obtained by multiplying the adhesion torque τe_slip by the suppression ratio a1_low, and the return torque is τe_slip[Nm]×a2_low[%] obtained by multiplying the adhesion torque τe_slip by the suppression ratio a2_low. Both of the suppression torque and return torque are controlled on the basis of the adhesion torque τe_slip at the time of the slip detection, which is a value smaller than the maximum adhesion torque τe_max. Also, both of the torque suppression ratio and return ratio are set to a1_low and a2_low which are values smaller than the torque suppression ratio/return ratios a1 and a2 under the normal condition to surely converge the slip.

A vector control unit 25 converts the command torque obtained by the command torque calculation unit 24 into a motor current command. A voltage calculation unit 29 converts the motor current command into a motor voltage command, and a PWM (pulse width modulation) that receives the motor voltage command transmits a PWM signal to the inverter 300.

The motor angular velocity calculated by the angular velocity calculation unit 3 may be replaced with rotating speed sensor information attached to the motor, or may be calculated by using sensor information. Also, the slip/skid detection control unit 1 may estimate the slip speed or the slip ratio from plural pieces of motor angular velocity information, and compare the slip speed or the slip ratio with a given threshold value to detect and release the slip/skid.

The just-before-detection maximum value retention unit 23 retains the estimated adhesion torque obtained by the adhesion torque calculation unit 20 between a given time before a time of the slip/skid detection, and a given time further before that given time. Then, when the slip/skid detection control unit 1 detects the slip/skid, and the slip/skid flag turns on, the just-before-detection maximum value retention unit 23 may then select a maximum value from the values of the retained plural estimated adhesion torques, and output the maximum value as a maximum adhesion torque τe_max. Also, when the slip/skid detection control unit 1 detects the slip/skid, and the slip/skid flag turns on, the just-before-detection maximum value retention unit 23 may then select an average value of the values of the retained plural estimated adhesion torques, and output the average value as a maximum adhesion torque τe_max.

Alternatively, when the slip/skid detection control unit 1 detects the slip/skid, and the slip/skid flag turns on, the just-before-detection maximum value retention unit 23 may obtain a difference between the average value of the values of the retained plural estimated adhesion torques and the retained estimated adhesion torques. Then, if the difference is larger than a set threshold value, the just-before-detection maximum value retention unit 23 may exclude the values of the estimated adhesion torques exceeding the threshold value, and obtain any one of the maximum value, the average value, and the minimum value, and output the obtained value as the maximum adhesion torque τe_max. When the values of the estimated adhesion torques exceeding the set threshold value are excluded, the maximum adhesion torque τe_max can be prevented from being made larger by noise. Also, when the maximum adhesion torque τe_max is obtained by using any one of the average value and the minimum value of the estimated adhesion torques, the value of the return torque becomes smaller than that when the maximum value is used. For that reason, when the value of the torque is pull up to the return torque, it is difficult to produce the slip, and the safety is further improved.

The slip/skid detection unit 14 may compare the adhesion torque τe_slip in the slip/skid state, which is obtained by the detection-time value retention unit 22, and the maximum adhesion torque τe_max which is obtained by the just-before-detection maximum value retention unit 23, and output a slip/skid detection flag. The slip/skid is detected by calculating the maximum adhesion torque τe_max and the adhesion torque τe_slip. For example, the slip/skid is detected with the use of, for example, a value of (τe_max−τe_slip) which is a difference between the maximum adhesion torque τe_max and the adhesion torque τe_slip, being larger than a given value, or a value of (τe_max/τe_slip) which is a ratio of the maximum adhesion torque τe_max and the adhesion torque τe_slip, being larger than a given value.

The slip/skid release unit 15 may compare the estimated adhesion torque output by the adhesion torque calculation unit 21 with the motor command torque, detect the release of the slip/skid, and output a flag. The slip/skid release after the slip/skid has been detected is detected by calculating the estimated adhesion torque and the motor command torque. The slip/skid release is detected with the use of, for example, a difference between the estimated adhesion torque and the motor command torque being smaller than a given threshold value, or a value of the ratio being smaller than a given threshold value.

Hereinafter, a sequence of operation according to this embodiment will be described with reference to FIG. 8.

The torque control unit 2 calculates the estimated adhesion torques, and retains the calculated values in sequence (001).

When the slip speed of the wheels is gradually increased, and the slip speed arrives at the macroscopic slip area from the microscopic slip area, the slip angular acceleration obtained by subtracting the motor angular acceleration corresponding to the vehicle acceleration obtained by application of the first-order lag filter 12 from the motor angular acceleration obtained by the angular acceleration calculation unit 11 becomes larger than a given threshold value, and the slip/skid detection unit 14 outputs a slip detection flag (002).

When the slip detection flag turns on, the detection-time value retention unit 22 retains the estimated adhesion torque when the slip flag turns on, and outputs the adhesion torque τe_slip in the slip state (003). The just-before-detection maximum value retention unit 23 retains the estimated adhesion torque obtained by the adhesion torque calculation unit 20 till a given time before a time of the slip/skid detection. The just-before-detection maximum value retention unit 23 then selects the maximum value when the slip flag turns on, from the values of the retained plural estimated adhesion torques, and outputs the selected value as the maximum adhesion torque τe_max (003). A time to go back for retaining the estimated adhesion torque by the just-before-detection maximum value retention unit 23 is until a time when the slip release of a previous slip under the readhesion control is detected at a maximum. Because the slip speed passes through the adhesion coefficient area when arriving at the macroscopic slip area from the microscopic slip area, the maximum value selected from the plurality of retained adhesion torques immediately before the slip is detected becomes the maximum adhesion torque τe_max which is the adhesion torque corresponding to the adhesion coefficient.

The adhesion rapid drop detection unit 27 compares the adhesion torque τe_slip in the slip/skid state, which is obtained by the detection-time value retention unit 22, with the maximum adhesion torque τe_max which is obtained by the just-before-detection maximum value retention unit 23 as illustrated in FIG. 7. The adhesion rapid drop detection unit 27 determines a case in which a value of (τe_max−τe_slip), which is a difference between τe_max and τe_slip, is smaller than a given value, or a value of (τe_max/τe_slip), which is a ratio of τe_max and τe_slip, is smaller than a given value, as the normal condition in which the adhesion coefficient does not drastically drops (004). Accordingly, the torque suppression/return ratio calculation unit 28 outputs the normal torque suppression/return ratios a1 and a2[%], and the torque pattern calculation unit 26 outputs the torque suppression/return torque patterns on the basis of the normal torque suppression/return ratios a1 and a2[%]. Also, in the determination of the adhesion coefficient rapid drop condition, (τe_max−τe_slip) which is a difference between τe_max and τe_slip, or (τe_max÷τe_slip) which is a ratio of τe_max and τe_slip is exemplified. However, if a difference of the magnitude between τe_max and τe_slip can be compared with each other, it would be apparent that four arithmetic operations or a unique function may be used without limit to the difference or the ratio.

When the value of (τe_max−τe_slip) which is a difference between τe_max and τe_slip, is larger than the given value, or the value of (τe_max/τe_slip) which is a ratio of τe_max and τe_slip, is larger than a given value, the adhesion rapid drop detection unit 27 determines this condition as the rapid drop condition of the adhesion coefficient caused by the rapid change of the adhesion state, and outputs an adhesion rapid drop detection flag. When the rapid drop of the adhesion coefficient is detected, the torque suppression/return ratio calculation unit 28 outputs a1_low and a2_low[%] smaller than a1 and a2[%] which are the suppression/return ratios under the normal condition. The torque pattern calculation unit 26 outputs the torque suppression/return torque patterns on the basis of a1_low and a2_low[%] smaller than a1 and a2[%] which are the suppression/return ratios under the normal condition.

As illustrated in FIG. 6, in the normal condition, the command torque calculation unit 24 outputs τe_slip[Nm]×a1[%] obtained by multiplying the adhesion torque τe_slip by the suppression ratio a1 as the suppression torque, and outputs τe_max[Nm]×a2[%] obtained by multiplying the maximum adhesion torque τe_max by the return ratio a2 as the return torque (005). Because the suppression torque is suppressed on the basis of the adhesion torque τe_slip which is smaller than the maximum adhesion torque τe_max, the convergence of the slip is surely realized. Also, because the return torque is returned to the original one on the basis of the maximum adhesion torque τe_max, the return torque can be set to a value of nearly the maximum adhesion torque τe_max corresponding to the adhesion coefficient, and the use of the adhesion torque is optimized to realize the maximization of the acceleration and deceleration performance.

As illustrated in FIG. 6, in the adhesion rapid drop condition, the command torque calculation unit 24 outputs τe_slip[Nm]×a1_low[%] obtained by multiplying the adhesion torque τe_slip by the suppression ratio a1_low as the suppression torque, and outputs τe_slip[Nm]×a2_low[%] obtained by multiplying the adhesion torque τe_slip by the return ratio a2_low as the return torque (006). Both of the suppression torque/return torque are controlled on the basis of the adhesion torque τe_slip at the time of the slip detection, which is a value smaller than the maximum adhesion torque τe_max. Also, both of the torque suppression ratio and return ratio are set to a1_low and a2_low which are values smaller than the torque suppression ratio/return ratio a1 and a2 under the normal condition to surely realize the slip convergence.

Figure 9:
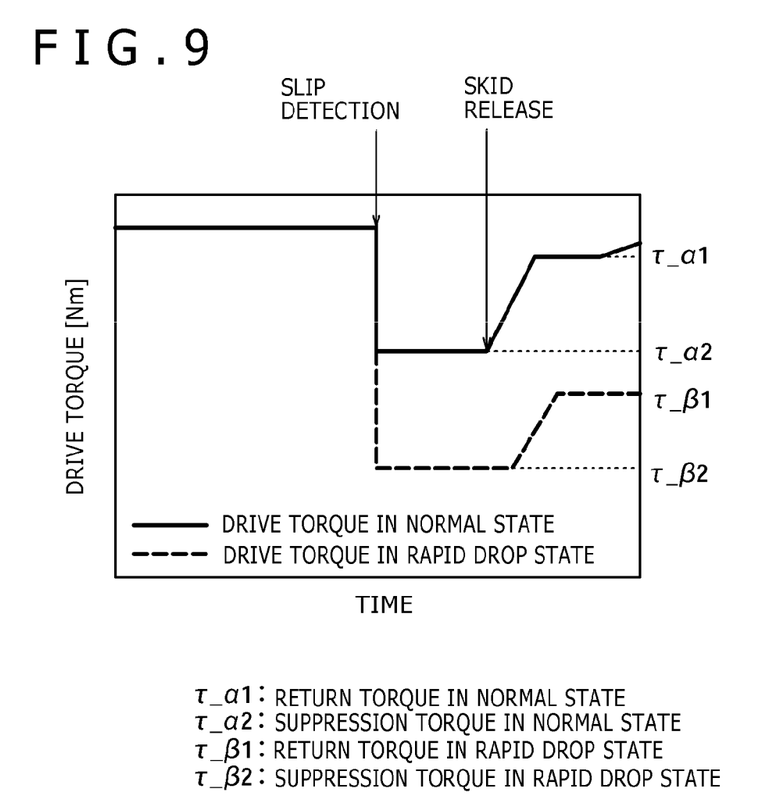
FIG. 9 is a diagram illustrating a difference of respective drive torque controls between a normal state and an adhesion condition rapid drop state.

Accordingly, as illustrated in FIG. 9, even if the drive toque immediately before the slip is detected is the same, the suppression torque and the return torque are output as different values depending on any one of the normal condition in which the adhesion rapid drop detection flag, is not output, and the adhesion rapid drop condition in which the adhesion rapid drop detection flag is output. In this embodiment, a suppression torque $\tau\_\alpha 2$ in the normal state, and a suppression torque $\tau\_\beta 2$ in the rapid drop state have a relationship of "$\tau\_\alpha 2 > \tau\_\beta 2$" with the result that the slip/skid suppression suitable under the respective conditions can be conducted. Also, likewise, $\tau\_\alpha 1$ and $\tau\_\beta 1$ which are the return torques under the respective conditions have a relationship "$\tau\_\alpha 1 > \tau\_\beta 1$" with the result that the readhesion control suitable under the respective conditions can be realized. For example, in FIG. 9, a concept that "normal state" and "rapid drop state" are replaced with "state of no rapid drop" and "normal state", respectively, and the suppression torque in the "state of no rapid drop" is made larger than that in the "normal state" is included in this embodiment. The same is also applied to the return torque.

When the slip detection occurs under the adhesion rapid drop condition, it is conceivable that the tangential force coefficient μ before the slip is detected changes from, for example, DRY (drying) in FIG. 2 to WET (wetness) when the slip is detected. Hence, under the adhesion rapid drop condition, processing is conducted on the basis of the adhesion coefficient after the idle has been detected, to thereby efficiently suppress the slip/skid. In this example, the slip occurrence state is described, but the same is functionally applicable to the skid occurrence state.

As described above, in this embodiment, the maximum adhesion torque is obtained with high precision while suppressing the calculation load, and the acceleration and deceleration performance at the time of the slip/skid detection can be improved. Also, when the adhesion state between the wheels and the rails is drastically changed to instantaneously lessen the adhesion coefficient, the suppression of the slip/skid suitable for the adhesion state can be realized with the detection of the rapid drop.

Second Embodiment

Figure 8:
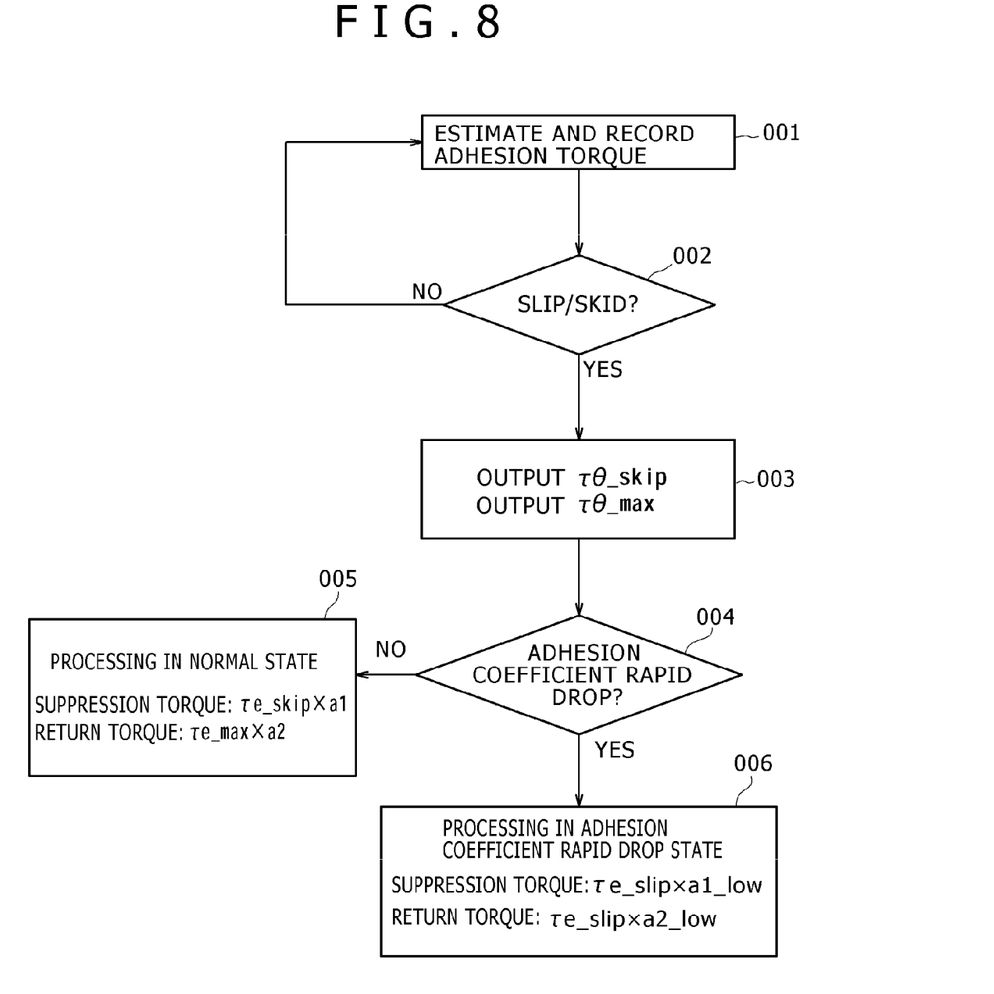
FIG. 8 is a flowchart illustrating a control of readhesion according to the present invention.

In a second embodiment, a control flow from (001) to (004) in FIG. 8 illustrating the first embodiment is the same, and replaceable.

When a value of (τe_max−τe_slip) which is a difference between τe_max and τe_slip is larger than a given threshold value, or a value of (τe_max/τe_slip) which is a ratio of τe_max and τe_slip is larger than a given threshold value, the adhesion rapid drop detection unit 27 determines this condition as the rapid drop condition of the adhesion coefficient caused by a rapid change in the adhesion state, and outputs an adhesion rapid drop detection flag. When the adhesion rapid drop detection unit 27 detects the rapid drop of the adhesion coefficient, the torque suppression/return ratio calculation unit 28 outputs the torque suppression/return torque patterns on the basis of b1_large and b2_large[Nm] larger than b1 and b2[Nm] which are suppression/return differences under the normal condition. The b1 and b1_large may be set to coefficients for subjecting the slipped or skidded wheels to readhesion.

In the second embodiment, in a flow (005) of FIG. 8, in the normal condition, the command torque calculation unit 24 outputs, as the suppression torque, τe_slip[Nm]−b1[Nm] obtained by subtracting a suppression difference b1 from the adhesion torque τe_slip. Also, the command torque calculation unit 24 outputs, as the return torque, τe_max[Nm]−b2[Nm] obtained by subtracting a return difference b2 from the maximum adhesion torque τe_max. The suppression torque surely realizes the convergence of the slip because the torque is suppressed on the basis of the adhesion torque τe_slip which is a value smaller than the maximum adhesion torque τe_max. Also, the return torque can be set to a value close to the maximum adhesion torque τe_max corresponding to the adhesion coefficient because the torque is returned on the basis of the maximum adhesion torque τe_max.

Also, in the processing (006) under the adhesion rapid drop condition, the command torque calculation unit 24 outputs, as the suppression torque, τe_slip[Nm]−b1_large[Nm] obtained by subtracting a suppression difference b1_large from the adhesion torque τe_slip. Also, the command torque calculation unit 24 outputs, as the return torque, τe_slip[Nm]−b2_large[Nm] obtained by subtracting a return difference b2_large from the adhesion torque τe_slip. Both of the suppression torque and return torque are controlled on the basis of the adhesion torque τe_slip at the time of the slip detection which is a value smaller than the maximum adhesion torque τe_max. Also, both of the torque suppression difference and return difference are set to b1_large and b2_large which are values larger than the torque suppression difference/return difference b1 and b2 under the normal condition. As a result, the slip convergence can be surely realized even under the condition where the adhesion coefficient is instantaneously drastically lessened.

As described above, in this embodiment, when the adhesion coefficient is equal to each other at the time of slip/skid detection, any one or all of "(suppression torque in normal state)>(suppression torque in adhesion coefficient rapid drop state)", and "(return torque in normal state)>(return torque in adhesion coefficient rapid drop state)" can be achieved. Therefore, a method of calculating the suppression torque or the return torque to be controlled is not limited to the subtraction illustrated in this embodiment. If the above hierarchical relationship of the toque values is satisfied, it would be apparent that four arithmetic operations or a unique function may be used.

What is claimed is:

1. A control device for an electric rolling stock including wheels, an electric motor that drives the wheels, and an inverter that controls the electric motor, the control device comprising:
    a slip/skid detection control unit that detects slip/skip of the electric rolling stock;
    an adhesion torque calculation unit that calculates an adhesion torque of the electric rolling stock;
    an adhesion torque retention unit that stores the calculated adhesion torque at regular intervals, outputs a first adhesion torque on the basis of the plurality of adhesion torques before detection when the slip/skid is detected, and outputs the adhesion torque in detection of the slip/skid as a second adhesion torque;
    a command torque generation unit that reduces a drive torque of the electric motor to a first drive torque when the slip/skid is detected; and
    a detection unit that detects a rapid change of the adhesion state on the basis of the first adhesion torque and the second adhesion torque when the slip/skid is detected,
    wherein the command torque generation unit sets the first drive torque to a different value between when the rapid change of the adhesion state is detected and when the rapid change of the adhesion state is not detected.

2. The control device for an electric rolling stock according to claim 1,
    wherein the command torque generation unit changes the drive torque of the electric motor to a second drive torque after the slip/skid is converged, and sets the second drive torque to a different value between when the rapid change of the adhesion state is detected and when the rapid change of the adhesion state is not detected.

3. The control device for an electric rolling stock according to claim 1,
    wherein the command torque generation unit increases a range of reduction of the first drive torque relative to the drive torque immediately before the slip/skid is detected when the rapid change of the adhesion state is detected, more than that when the rapid change of the adhesion state is not detected.

4. The control device for an electric rolling stock according to claim 2,
    wherein the command torque generation unit increases a range of reduction of the second drive torque relative to the drive torque immediately before the slip/skid is detected when the rapid change of the adhesion state is detected, more than that when the rapid change of the adhesion state is not detected.

5. The control device for an electric rolling stock according to claim 2,
    wherein, when the rapid change of the adhesion state is not changed,
    the command torque generation unit sets the first drive torque to a product of the second adhesion torque and a first given coefficient, and
    the command torque generation unit sets the second drive torque to a product of the first adhesion torque and a second given coefficient, and
    wherein when the rapid change of the adhesion state is changed,
    the command torque generation unit sets the first drive torque to a product of the second adhesion torque and a third given coefficient which is smaller than the first given coefficient, and
    the command torque generation unit sets the second drive torque to a product of the second adhesion torque and a fourth given coefficient which is smaller than the second given coefficient.

6. The control device for an electric rolling stock according to claim 2,
    wherein, when the rapid change of the adhesion state is not changed, the command torque generation unit sets the first drive torque to a difference obtained by subtracting a fifth given coefficient from the second adhesion torque, and the command torque generation unit sets the second drive torque to a difference obtained by subtracting a sixth given coefficient from the first adhesion torque, wherein when the rapid change of the adhesion state is changed, the command torque generation unit sets the first drive torque to a difference obtained by subtracting a seventh given coefficient which is larger than the fifth given coefficient from the second adhesion torque, and the command torque generation unit sets the second drive torque to a difference obtained by subtracting an eighth given coefficient which is larger than the sixth given coefficient from the second adhesion torque.

7. The control device for an electric rolling stock according to claim 1, wherein the detection unit detects the rapid change of the adhesion state when a difference obtained from subtracting the second adhesion torque from the first adhesion torque exceeds a first threshold value, or when an quotient obtained by dividing the first adhesion torque by the second adhesion torque exceeds a second threshold value.

8. The control device for an electric rolling stock according to claim 1, wherein the adhesion torque retention unit outputs, as the first adhesion torque, any one of a maximum value and an average value of the plurality of adhesion torques, or any one of a maximum value, an average value, and a minimum value of differences between the average value and the plurality of adhesion torques, which are smaller than a given value.

9. An electric rolling stock comprising:

the control device for an electric rolling stock according to claim 1.

10. A motor control method for an electric rolling stock including wheels, an electric motor that drives the wheels, an inverter that controls the electric motor, and an inverter control unit that controls the inverter, the method comprising:

detecting slip/skid of the electric rolling stock;

calculating an adhesion torque of the electric rolling stock;

storing the calculated adhesion torque at regular intervals, outputting a first adhesion torque on the basis of the plurality of adhesion torques before detection when the slip/skid is detected, and outputting the adhesion torque in detection of the slip/skid as a second adhesion torque;

reducing a drive torque of the electric motor to a first drive torque when the slip/skid is detected;

detecting a rapid change of the adhesion state on the basis of the first adhesion torque and the second adhesion torque when the slip/skid is detected; and setting the first drive torque to a different value between when the rapid change of the adhesion state is detected and when the rapid change of the adhesion state is not detected.

11. The motor control method according to claim 10, wherein the drive torque of the electric motor is changed to a second drive torque after the slip/skid is converged, and the second drive torque is set to a different value between when the rapid change of the adhesion state is detected and when the rapid change of the adhesion state is not detected.

12. The motor control method according to claim 10, wherein a range of reduction of the first drive torque relative to the drive torque immediately before the slip/skid is detected when the rapid change of the adhesion state is detected is increased more than that when the rapid change of the adhesion state is not detected.

13. The motor control method according to claim 11, wherein a range of reduction of the second drive torque relative to the drive torque immediately before the slip/skid is detected when the rapid change of the adhesion state is detected is increased more than that when the rapid change of the adhesion state is not detected.

14. The motor control method according to claim 11, wherein, when the rapid change of the adhesion state is not changed, the first drive torque is set to a product of the second adhesion torque and a first given coefficient, and the second drive torque is set to a product of the first adhesion torque and a second given coefficient, and wherein when the rapid change of the adhesion state is changed, the first drive torque is set to a product of the second adhesion torque and a third given coefficient which is smaller than the first given coefficient, and the second drive torque is set to a product of the second adhesion torque and a fourth given coefficient which is smaller than the second given coefficient.

15. The motor control method according to claim 11, wherein, when the rapid change of the adhesion state is not changed, the first drive torque is set to a difference obtained by subtracting a fifth given coefficient from the second adhesion torque, and the second drive torque is set to a difference obtained by subtracting a sixth given coefficient from the first adhesion torque, wherein when the rapid change of the adhesion state is changed, the first drive torque is set to a difference obtained by subtracting a seventh given coefficient which is larger than the fifth given coefficient from the second adhesion torque, and the second drive torque is set to a difference obtained by subtracting an eighth given coefficient which is larger than the sixth given coefficient from the second adhesion torque.

16. The motor control method according to claim 10, wherein the rapid change of the adhesion state is detected when a difference obtained from subtracting the second adhesion torque from the first adhesion torque exceeds a first threshold value, or when an quotient obtained by dividing the first adhesion torque by the second adhesion torque exceeds a second threshold value.

17. The motor control method according to claim 10, wherein any one of a maximum value and an average value of the plurality of adhesion torques, or any one of a maximum value, an average value, and a minimum value of differences between the average value and the plurality of adhesion torques, which are smaller than a given value, is output as the first adhesion torque.

* * * * *